United States Patent
Fukuda et al.

(10) Patent No.: US 10,838,994 B2
(45) Date of Patent: Nov. 17, 2020

(54) DOCUMENT RANKING BY PROGRESSIVELY INCREASING FACETED QUERY

(71) Applicant: International Business Machines Corporation, Armonk, NY (US)

(72) Inventors: Takashi Fukuda, Tokyo (JP); Hiroaki Kikuchi, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 527 days.

(21) Appl. No.: 15/691,900

(22) Filed: Aug. 31, 2017

(65) Prior Publication Data
US 2019/0065584 A1   Feb. 28, 2019

(51) Int. Cl.
G06F 16/00 (2019.01)
G06F 16/33 (2019.01)
G06F 16/93 (2019.01)
G06F 16/332 (2019.01)
G06F 16/35 (2019.01)

(52) U.S. Cl.
CPC ...... *G06F 16/3344* (2019.01); *G06F 16/3329* (2019.01); *G06F 16/35* (2019.01); *G06F 16/93* (2019.01)

(58) Field of Classification Search
CPC ...... G06F 16/35; G06F 16/93; G06F 16/3329; G06F 16/3344
See application file for complete search history.

(56) References Cited

U.S. PATENT DOCUMENTS

| | | | |
|---|---|---|---|
| 6,519,586 B2 * | 2/2003 | Anick | G06F 16/951 707/742 |
| 6,523,026 B1 * | 2/2003 | Gillis | G06F 16/3332 |
| 10,585,931 B1 * | 3/2020 | Young | G06F 16/2428 |
| 2002/0091661 A1 * | 7/2002 | Anick | G06F 16/951 |
| 2009/0171907 A1 | 7/2009 | Radovanovic | |
| 2011/0320442 A1 * | 12/2011 | Faruquie | G06F 16/958 707/723 |
| 2012/0011129 A1 * | 1/2012 | van Zwol | G06F 16/951 707/748 |

(Continued)

OTHER PUBLICATIONS

Sarkas et al., Measuredriven KeywordQuery Expansion, VLDB '09, Aug. 2428, 2009, Lyon, France.

*Primary Examiner* — Jean M Corrielus
(74) *Attorney, Agent, or Firm* — Garg Law Firm, PLLC; Rakesh Garg; Joseph Polimeni (57) ABSTRACT

Natural Language Processing (NLP) is performed on a corpus using a processor and a memory to extract a set of facets corresponding to a dimension in a set of dimensions. Using a score threshold, a subset of the set of facets is selected where each facet in the set of facets has a corresponding score relative to the corpus. A subsequent query is formed by increasing a complexity of a previous query using a facet in the subset of facets. The subsequent query is executed on at least a portion of the corpus. The documents in a new result set are ranked, the new result set being in response to executing the subsequent query. An output is produced from the new result set, which includes a ranking of that subset of documents whose ranks have changed by more than a threshold rank distance from the corresponding ranks in the corpus.

20 Claims, 6 Drawing Sheets

(56) References Cited

U.S. PATENT DOCUMENTS

| | | | |
|---|---|---|---|
| 2012/0030152 A1* | 2/2012 | Pueyo | G06Q 30/00 |
| | | | 706/12 |
| 2013/0226916 A1* | 8/2013 | Dredze | G06F 16/3322 |
| | | | 707/727 |
| 2014/0075893 A1* | 3/2014 | Weder | B65B 25/026 |
| | | | 53/461 |
| 2015/0006500 A1 | 1/2015 | Ambasta et al. | |
| 2015/0012529 A1 | 1/2015 | Emanuel et al. | |
| 2015/0199417 A1* | 7/2015 | Ashparie | G06F 16/355 |
| | | | 707/737 |
| 2016/0063120 A1 | 3/2016 | Ivchenko | |
| 2017/0109445 A1 | 4/2017 | Daya et al. | |
| 2017/0293676 A1* | 10/2017 | Lowe | G06F 16/93 |
| 2017/0344565 A1* | 11/2017 | Castillo | G06F 16/285 |
| 2018/0137190 A1* | 5/2018 | Beller | G06F 16/285 |
| 2018/0165580 A1* | 6/2018 | Boyer | G06F 16/00 |
| 2019/0258652 A1* | 8/2019 | Beller | G06F 7/08 |

* cited by examiner

DOCUMENT RANKING BY PROGRESSIVELY INCREASING FACETED QUERY

TECHNICAL FIELD

The present invention relates generally to a method, system, and computer program product for ranking documents in a corpus. More particularly, the present invention relates to a method, system, and computer program product for document ranking by progressively increasing faceted query.

BACKGROUND

A corpus (plural: corpora) is data, or a collection of data, used in linguistics and language processing. A corpus generally comprises large volume of data, usually text, stored electronically. Hereinafter, unless expressly distinguished where used, a document comprises any data that is available as text, can be converted to text, or is recognizable as text, in some natural language, for the purposes of Natural Language Processing (NLP).

A natural language is a written or a spoken language having a form that is employed by humans for primarily communicating with other humans or with systems having a natural language interface. Thus, a document contemplated herein can be text, audio data that can be transcribed into text, video data from which textual description or transcription is possible, or some combination thereof.

NLP is a technique that facilitates exchange of information between humans and data processing systems. For example, one branch of NLP pertains to transforming human readable or human understandable content from a document into machine usable data. For example, NLP engines are presently usable to accept input content such as a newspaper article or human speech, and produce structured data, such as an outline of the input content, most significant and least significant parts, a subject, a reference, dependencies within the content, and the like, from the given content.

NLP employs techniques such as shallow parsing and deep parsing. Shallow parsing is a term used to describe lexical parsing of a given content using NLP. For example, given a sentence, an NLP engine determining what the sentence semantically means according to the grammar of the language of the sentence is the process of lexical parsing, to wit, shallow parsing. In contrast, deep parsing is a process of recognizing the relationships, predicates, or dependencies, and thereby extracting new, hidden, indirect, or detailed structural information from distant content portions in a given document or a corpus.

Generally, not all documents are equally important, relevant, or useful for a given purpose, or contain equally useful information. Document ranking is a known process of arranging documents in some order of relevance according to a given condition. One known method of document ranking arranges the documents based on the frequency of occurrence of a given word or phrase therein. For example, a search query for "zebra" might result in one hundred documents. These one hundred documents are ranked according to a number of times the word "zebra" appears in them. The highest ranking document will have the most occurrences of the word, and the last ranking document the least.

Another known method of document ranking orders the documents in a set of documents, where the order is indicative of a sentiment expressed in the documents. For example, a search query for "favorable impression of Florida vacation" might find ten documents that each discuss vacation experiences in Florida. These ten documents are ranked by a degree of positive sentiment expressed towards the experience of vacationing in Florida.

The illustrative embodiments recognize that such existing methods of document ranking are deficient in answering complex queries about a corpus. For example, in one case, a user might begin a query with a very generic or high-level idea about the subject of the search. The user's knowledge on the subject improves once the query produces a result set—an initial corpus. Based on the contents of the corpus and the ranking, the user's knowledge on the subject is improved or otherwise altered such that the user is in a better position to make subsequent queries that are more detailed than the previous queries on the subject. The illustrative embodiments recognize that a presently available method for document ranking is insufficient to aid the user in constructing progressively more complex queries based on the result of one or more previous queries.

SUMMARY

The illustrative embodiments provide a method, system, and computer program product. An embodiment includes a method that performs, using a processor and a memory, Natural Language Processing (NLP) on a corpus to extract a set of facets corresponding to a dimension in a set of dimensions. The embodiment selects, using a score threshold, a subset of the set of facets, wherein each facet in the set of facets has a corresponding score relative to the corpus. The embodiment forms a subsequent query by increasing a complexity of a previous query using a facet in the subset of facets. The embodiment executes the subsequent query on at least a portion of the corpus. The embodiment ranks documents in a new result set, the new result set being responsive to executing the subsequent query. The embodiment outputs, from the new result set, a ranking of that subset of documents with ranks that changed by more than a threshold rank distance from the corresponding ranks in the corpus. Thus, the embodiment enables construction of progressively more complex subsequent queries, and re-ranking documents according to the relevance to the new knowledge obtained from the queries in previous iterations in the same search.

Another embodiment further forms a sub-corpus from the corpus such that each document in the sub-corpus participates in a facet in the subset of facets, the sub-corpus forming the portion of the corpus on which the subsequent query is executed. Thus, the embodiment enables construction of progressively more complex subsequent queries, and re-ranking documents according to the relevance to the new knowledge obtained from the queries in previous iterations in the same search, wherein the re-ranked documents are limited to the documents that participate in the significant facets up to at least a specified level of participation.

Another embodiment further forms a sub-corpus from the corpus such that each document in the sub-corpus participates in a facet in the subset of facets. The embodiment executes the subsequent query to find a different set of documents, the different set of documents not being included in the corpus. The embodiment forms the portion of the corpus using the sub-corpus and the different set of documents. Thus, the embodiment enables construction of progressively more complex subsequent queries, and re-ranking documents according to the relevance to the new knowledge obtained from the queries in previous iterations in the same search, wherein the re-ranked documents are limited to the documents that participate in the significant facets up to at least a specified level of participation. These documents include not only documents obtained in a result set of a previous iteration but also new documents that are found in a new result set in the current iteration.

In one embodiment, the previous query is a query used in a previous iteration of document ranking in a search session where the set of facets is extracted. Thus, the embodiment enables increasing the complexity of the query in the same search session using one or more queries that have previously occurred during any iteration in the same search session.

Another embodiment further computes a ranking of documents in the corpus, wherein a rank of a document in the corpus is a function of a participation of the document in a facet in the set of facets. Thus, the embodiment provides one method of ranking the documents according to the participation of the documents in the facets.

In another embodiment, a facet comprises a characteristic of a document in the corpus, wherein the characteristic is recognizable by NLP, and wherein the dimension comprises a type of the characteristic. Thus, the embodiment provides one manner of identifying and extracting the facets.

In another embodiment, the characteristic is a sentiment expressed in a language of the corpus. Thus, the embodiment provides one particular type of facet that can be identified using NLP, extracted, and used in the document ranking.

Another embodiment further deduces the set of dimensions from an activity, wherein the activity is other than a search activity involving the corpus. Thus, the embodiment provides one method of identifying the dimensions within which facets have to be identified and extracted.

Another embodiment further receives the set of dimensions as an input. Thus, the embodiment provides another method of identifying the dimensions within which facets have to be identified and extracted.

Another embodiment further receives an initial query. The embodiment constructs an initial corpus responsive to the initial query, the initial corpus comprising a set of documents returned by a search engine in a result set in response to the initial query, the initial corpus forming the corpus in a first iteration of document ranking in a search session where the set of facets is extracted. Thus, the embodiment provides one method of forming the corpus using which progressively more complex subsequent queries can be constructed.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that the presently available tools or solutions do not address these needs or provide adequate solutions for these needs. The illustrative embodiments used to describe the invention generally address and solve the above-described problems and other problems related to document ranking by progressively increasing faceted query.

An embodiment can be implemented as a software application. The application implementing an embodiment can be configured as a modification of an existing search engine or document ranking system, as a separate application that operates in conjunction with an existing search engine or document ranking system, a standalone application, or some combination thereof.

A corpus can have numerous dimensions. A dimension of a corpus is a category of a property of the documents in the corpus. A property of the document is called a facet. A dimension can have any number of facets.

For example, a word or phrase occurring in the metadata or anywhere else in a document of a corpus may be a facet of the corpus and a type of the word or phrase may be a dimension of the corpus. For example, a dimension may be Noun (e.g., names of people, places, things, etc.), a type of word (e.g., descriptive, adjective, etc.), sentiments expressed (e.g., positive, negative, supportive, etc.), components (e.g., or the topic or subject of the query), and many more.

To give some non-limiting examples, a dimension may be "vehicle brands" and a facet in that dimension may be "Toyota", "Nissan", "Ford", "BMW", etc. ("Toyota", "Nissan", "Ford", and "BMW" are trademarks owned by their respective owners in the United States and in other countries). Another example dimension may be "vehicle parts" and a facet in that dimension may be "body", "tires", "brakes", "fender", etc. Another example dimension may be "states" and a facet in that dimension may be "Texas", "California", "Wisconsin", "Pennsylvania", etc.

These examples of dimensions and facets are not intended to be limiting. From this disclosure, those of ordinary skill in the art will be able to conceive many other dimensions and facets, and the same are contemplated within the scope of the illustrative embodiments.

An embodiment receives an initial query from a user. In response to the initial query, the embodiment obtains a result set. The documents in the result set form the initial corpus.

The embodiment determines a set of dimensions that are of interest to the user. For example, in one embodiment, the user may specify one or more dimensions. In another embodiment, one or more dimensions may be inferred, deduced, or derived from other activities of the user—i.e., activities other than the search, such as web-browsing, search history, subject-matter domain of the user's occupation, and the like.

Using the set of dimensions and the initial corpus, the embodiment causes an NLP engine to compute or extract from the initial corpus a set of facets in a dimension. For example, if the dimension were "states", the set of facets could include "Texas", "California", "Wisconsin", and "Pennsylvania".

Not every document in the corpus need include every facet. Some documents of the corpus may not include any of the extracted facets. Some document of the corpus may include more than one of the extracted facets. Accordingly, one embodiment computes a score associated with a facet. As a non-limiting example, a score of a facet may be a function of a number of occurrences of the facet in the corpus or a sub-corpus (a subset of the set of documents in the corpus).

An embodiment selects the facets with scores that exceed a threshold score. For the selected facets, the embodiment selects those documents from the corpus which participate in the facet. The selected documents form a sub-corpus.

As one example, a document participates in a facet if the document includes the facet. As another example, a document participates in a facet if the document includes an equivalent of the facet. As another example, a document participates in a facet if the document provides a supporting fact for the facet.

An embodiment ranks the documents in the sub-corpus according to their participation in one or more facets. As a non-limiting example, a document's rank may be a function of a participation value of the document as to each facet in which the document participates.

Optionally, as an intermediate step, one embodiment outputs the sub-corpus with the document ranking within the sub-corpus, the selected facets having scores greater than the score threshold, the subset of dimensions in which the selected facets belong, or some combination thereof.

An embodiment compares the ranking of a document in the sub-corpus with the ranking of the same document in the previous corpus before the document was selected into the sub-corpus for facet participation. The embodiment performs this operation for some or all member documents of the sub-corpus. The embodiment selects into a new sub-corpus (subset of the subset of documents in the sub-corpus) the documents from the sub-corpus with ranks that changed by more than a threshold rank distance. For example, a document may have been ranked $_{99th}$ in the previous corpus and ranked $_{3rd}$ in the sub-corpus. Accordingly, the rank distance for the document is 99−3=96, which is greater than an example rank distance threshold of 10.

The embodiment outputs the new sub-corpus with the document ranking within the new sub-corpus, the selected facets having scores greater than the score threshold, the subset of dimensions in which the selected facets belong, or some combination thereof. In one embodiment, the new sub-corpus becomes the corpus for subsequent queries. In another embodiment, the sub-corpus becomes the corpus for subsequent queries.

The information output from an embodiment as described above enables the user to become more informed about the contents of the result set. Particularly, the user—who began with an initial query based only on the user's generally defined needs—now knows that certain documents have certain high scoring facets in certain dimensions, and that these documents are ranked high or low based on their level of participation in certain facets. The user now has better information or knowledge of the data that exists pertaining to the user's need.

To leverage this knowledge, an embodiment constructs, or assists the user in constructing a new query (subsequent query). As a non-limiting example, one embodiment constructs a subsequent query by combining one or more facets from one or more dimensions as qualifiers in a previous query. For example, if the previous query were "Toyota", and an embodiment outputs ranked documents with facets "body", "tires", and "brakes" in dimension "Parts", a subsequent query can be "Toyota, where parts=body" or a suitable equivalent thereof in a suitable query language.

For the purposes of the subsequent query, the previous new sub-corpus becomes the new corpus and the process described with respect to the previous query, above, is repeated. New facets and/or dimensions might emerge from this iterative exercise, existing facets and/or dimensions might become irrelevant, the scores of existing facets might become strengthened or weakened, or some combination of these events might occur depending upon the specific query and installation.

In this manner, the knowledge of the user progressively increases as new and increasingly complex subsequent queries are iteratively constructed and executed. A subsequent query operates as the initial query in the above description, with the new sub-corpus operating as the initial corpus in the above description.

Suppose, for example, that documents A, B, C, D, E, and F were in the initial corpus, documents A, B, C, and D were in the sub-corpus, and documents A, B, and C were in the new sub-corpus. In one embodiment, the corpus for a subsequent query includes only {A, B, C}, as described earlier.

In another embodiment, the corpus for a subsequent query—which is the new sub-corpus of the previous query—can be augmented with new documents that are newly found in response to performing a new search using the subsequent query. In such an embodiment, the corpus for a subsequent query includes not only documents A, B, and C, but also documents M, N, and P, which are found by performing a new search using the subsequent query. The corpus for the subsequent query then becomes {A, B, C, M, N, P} and this corpus is regarded as the initial corpus for the purposes of the subsequent query (which is regarded as the initial query) in the manner described above.

The manner of document ranking by progressively increasing faceted query described herein is unavailable in the presently available methods. A method of an embodiment described herein, when implemented to execute on a device or data processing system, comprises substantial advancement of the functionality of that device or data processing system in ranking documents resulting from initial search queries, enabling construction of progressively more complex subsequent queries, and re-ranking documents according to the relevance to the new knowledge obtained from the queries in previous iterations in the same search.

The illustrative embodiments are described with respect to certain types of searches, queries, dimensions, facets, scores, ranks, thresholds, algorithms, search engines, documents, corpora, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
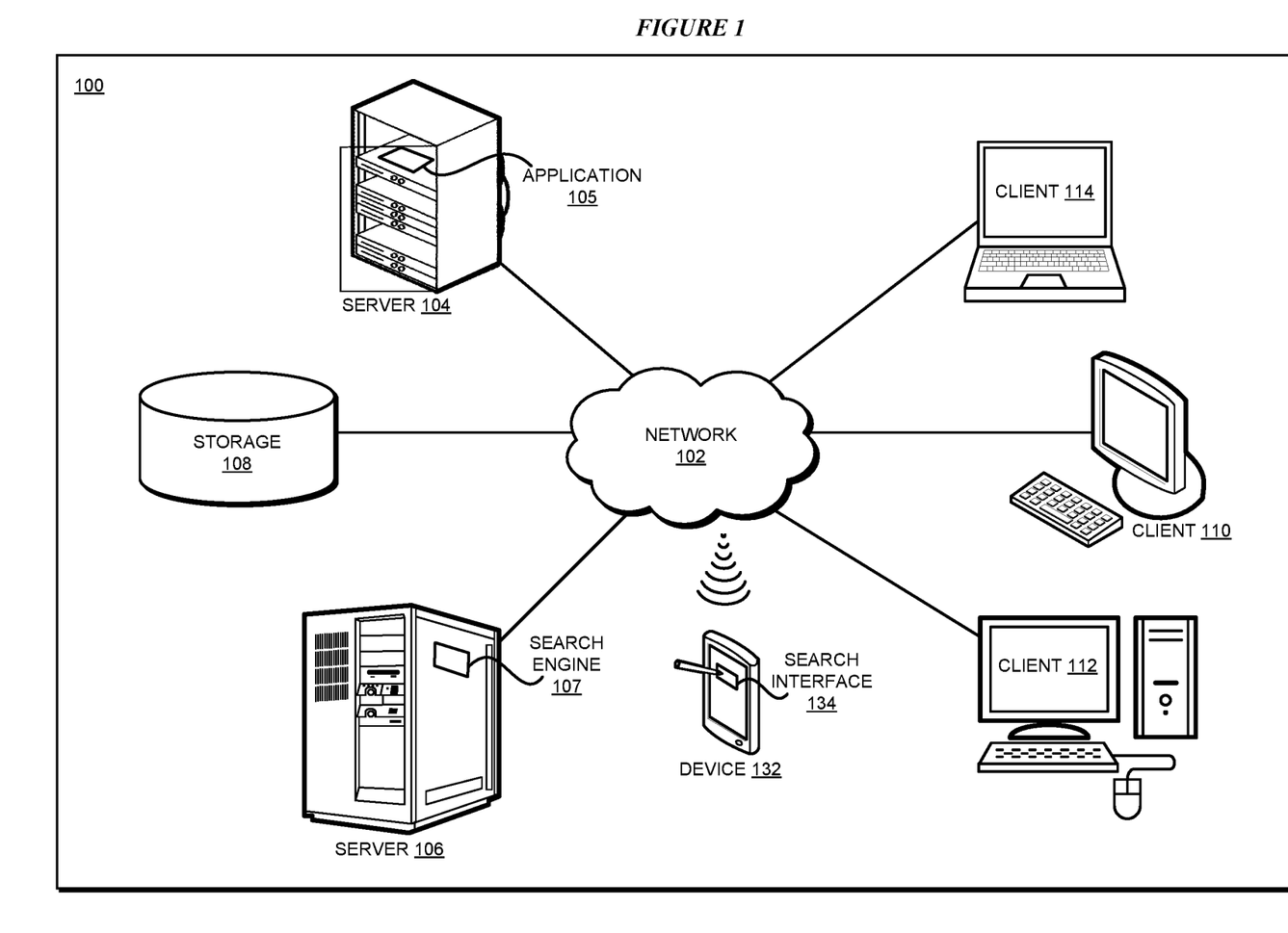
FIG. 1 depicts a block diagram of a network of data processing systems in which illustrative embodiments may be implemented.
Figure 2:
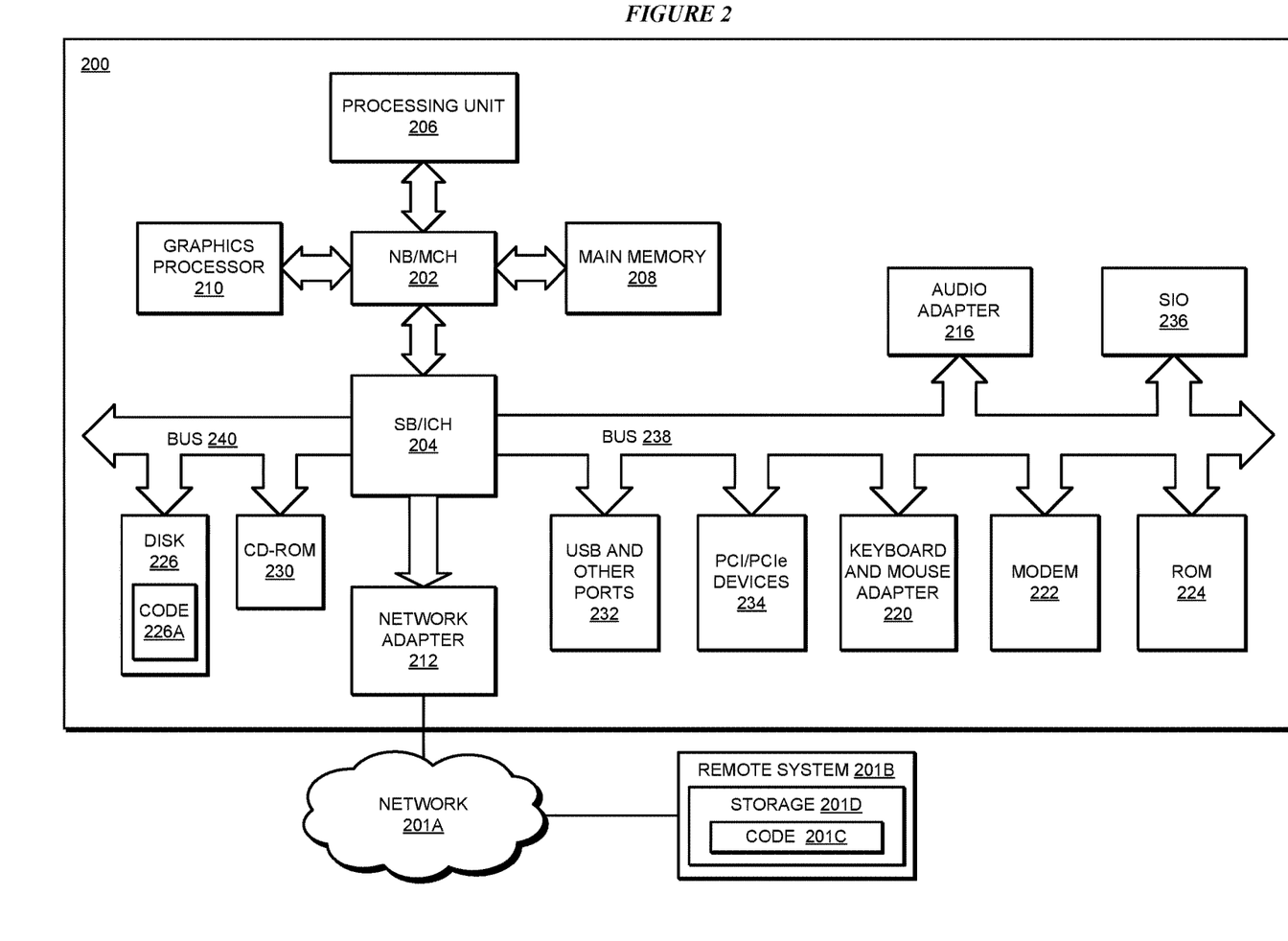
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 implements an embodiment described herein. Search engine 107 is an example search engine or search algorithm that is used for constructing a corpus as described herein. Search engine 103 may be a separate pre-implemented search engine or a search algorithm implemented in or with application 105. Interface 134 is a user interface, which is usable by a user to input an initial search query, review the outputs of application 105, and interact with application 105 to construct a subsequent query, as described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
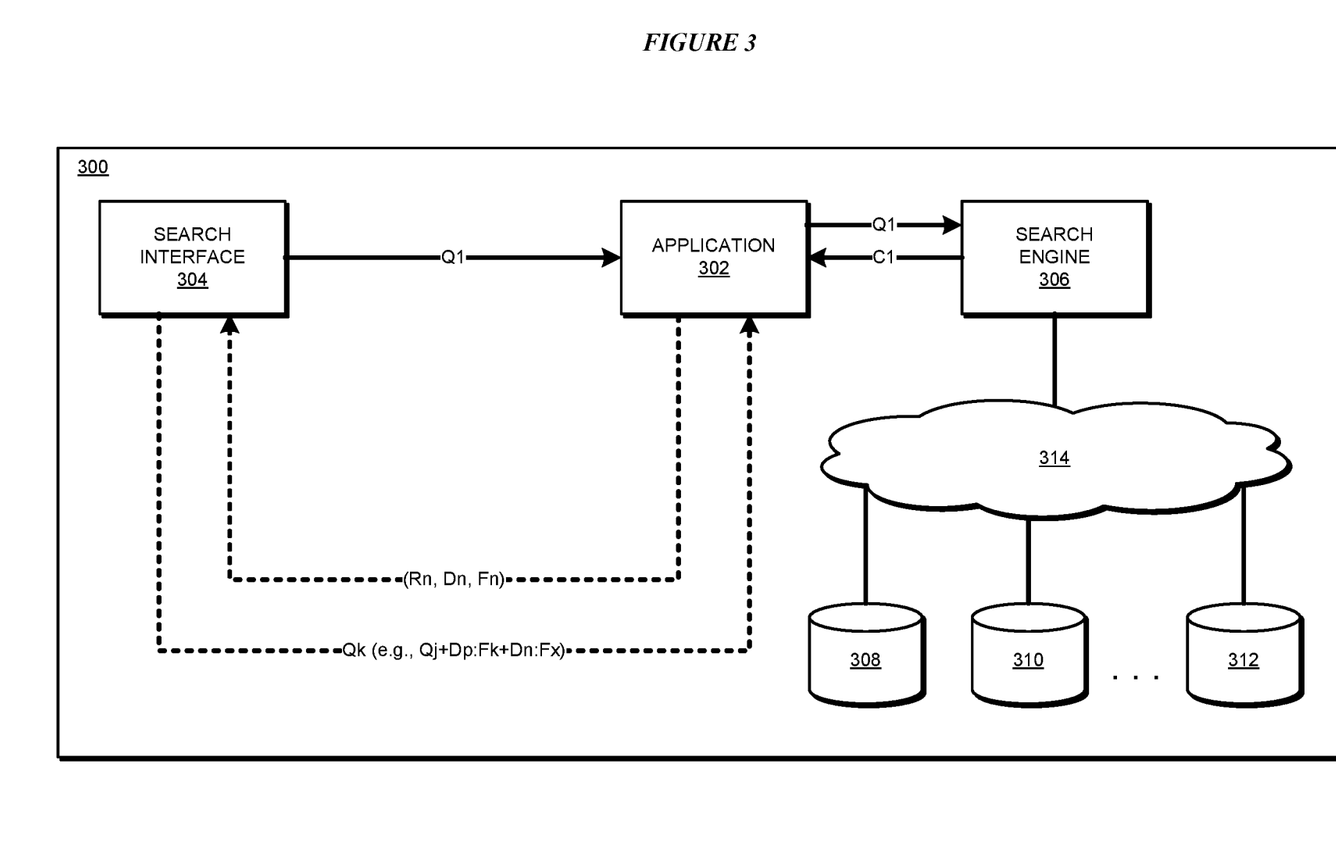
FIG. 3 depicts a block diagram of an example configuration for document ranking by progressively increasing faceted query in accordance with an illustrative embodiment.

With reference to FIG. 3, this figure depicts a block diagram of an example configuration for document ranking by progressively increasing faceted query in accordance with an illustrative embodiment. Application 302 is an example of application 105 in FIG. 1. Interface 304 is an example of interface 134 in FIG. 1. Search engine 306 is an example of search engine 107 in FIG. 1.

Interface 304 supplies initial query Q1 to application 302. Application 302 supplies Q1 to search engine 306, which obtains a result set from any number of data sources, such as data sources 308, 310, and 312, over network 314. Application 302 obtains initial corpus C1 from search engine 306.

By processing C1 as described herein, application 302 produces document ranking R, a set of dimensions D, and one or more facets F in a dimension. at the first iteration, which processes Q1, application 302 produces R1, D1, and F1 as described earlier. In response to subsequent query Qn (not shown), application 302 produces Rn, Dn, and Fn.

Interface 304 uses an immediately previous output of application 302, or an output produced earlier in a sequence of iterations to construct a subsequent query. For example, subsequent query Qk may build upon Ql or Qj, by adding facets Fk from dimension Dp and facet Fx from dimension Dn. Facets Fk and Fx may come from application 302's output in iteration k-1, k-2, or k-p, or some combination of one or more previous iterations in the same search session.

Figure 4:
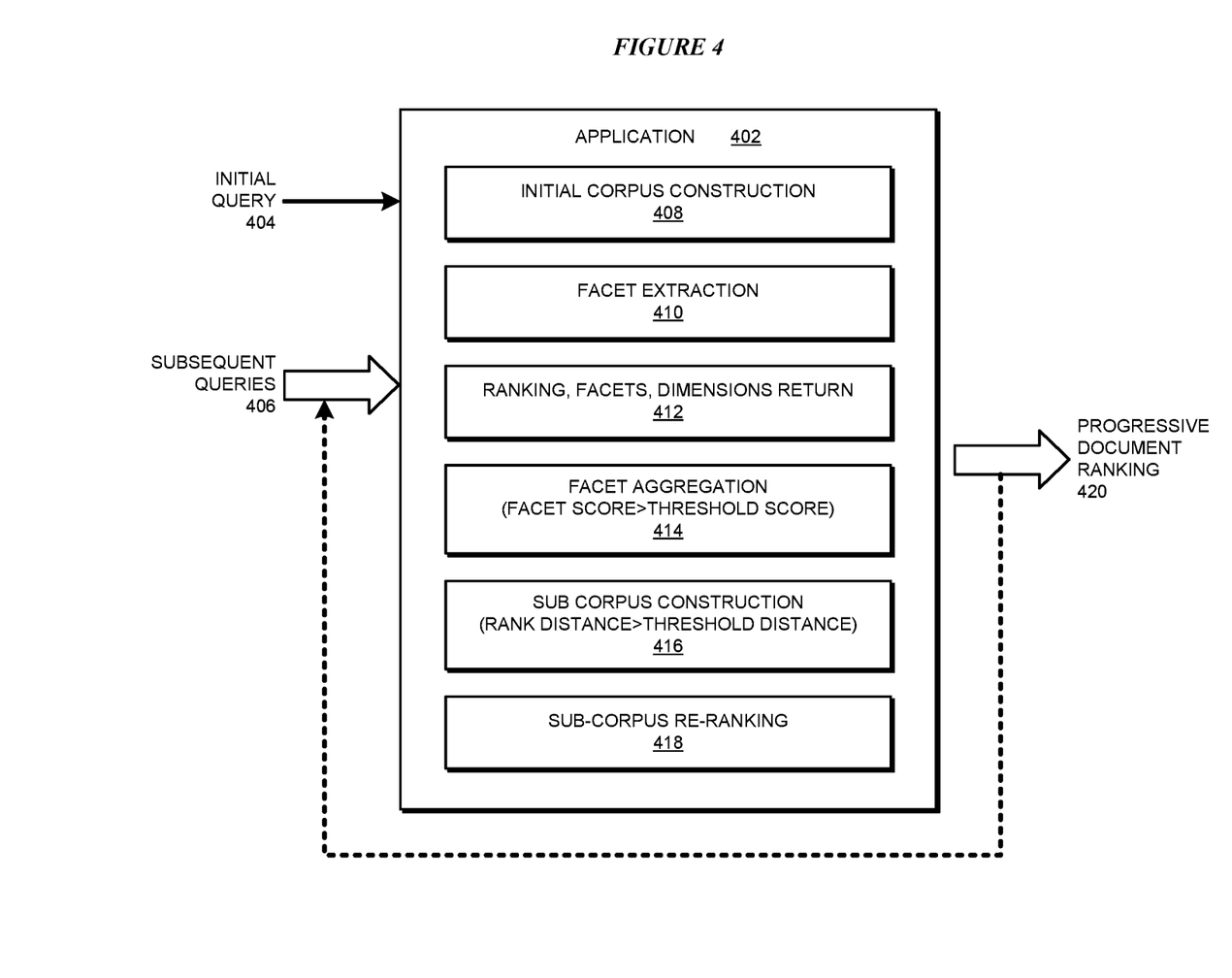
FIG. 4 depicts a block diagram of an application for document ranking by progressively increasing faceted query in accordance with an illustrative embodiment.

With reference to FIG. 4, this figure depicts a block diagram of an application for document ranking by progressively increasing faceted query in accordance with an illustrative embodiment. Application 402 can be used as application 302 in FIG. 3. Initial query 404 is an example of initial query Q1 in FIG. 3. Subsequent queries 406 are one or more subsequent queries Qk in FIG. 3.

Component 408 constructs the initial corpus, e.g., C1 in FIG. 3. In one embodiment, component 408 may call an existing search engine. In another embodiment, component 408 may implement a search algorithm or an interface thereto.

Component 410 determines a set of dimensions to be used with the corpus constructed by component 408. In one embodiment, component 410 receives (not shown) a dimension of interest from the user. In another embodiment, component 410 deduces or derives a dimension from user activities other than the present search session.

Component 412 optionally computes a ranking of the documents in the corpus using a function over the participation values of a document for various facets in which the document participates. Component 412 can also be configured to optionally return the set of dimensions and the sets of facets in dimensions as determined from the corpus.

Component 414 performs facet aggregation. More specifically, component 414 selects the facets with scores that exceed a score threshold, as described herein. The score threshold can be configured for use in application 402 in any suitable manner, including but not limited to being passed as an input parameter (not shown).

Component 416 constructs a sub-corpus of the documents from the corpus which participate in the selected facets. Component 416 ranks the documents in the sub-corpus according to their participation in the selected facets. Component 416 further selects those documents from the sub-corpus not a new sub-corpus as described herein, with ranks that changed by greater than a threshold rank distance between the ranking in the corpus and the ranking in the sub-corpus.

Component 418 ranks the documents selected in the new sub-corpus and computes output 420. Output 420 includes the final document ranking for the current ranking iteration. Output 420 may also include the selected facets and the dimensions in which the selected facets appear. Application 402 receives or constructs a subsequent query 406 for the next iteration of the search session using output 420. Particularly, application 402 uses output 420 to progressively increase the complexity of the subsequent query 406. The next iteration, which uses the subsequent query 406 created in this manner, causes output 420 to also progressively change in the next iteration.

Any number of iterations can be performed within a search session. For example, a user may decide, or application 402 may be configured to end the iterations once a document ranking that is satisfactory according to a specified condition is reached. As another example, a user may decide, or application 402 may be configured to end the iterations once a document ranking does not change by more than a threshold amount between iterations.

Generally, the iterations can be configured to end according to any condition that is suitable for a given implementation, such as after a preset number of iterations have been run, a configured amount of computing resources have been consumed, and many other types of conditions. Such variety in the ending conditions is contemplated within the scope of the illustrative embodiments.

Figure 5:
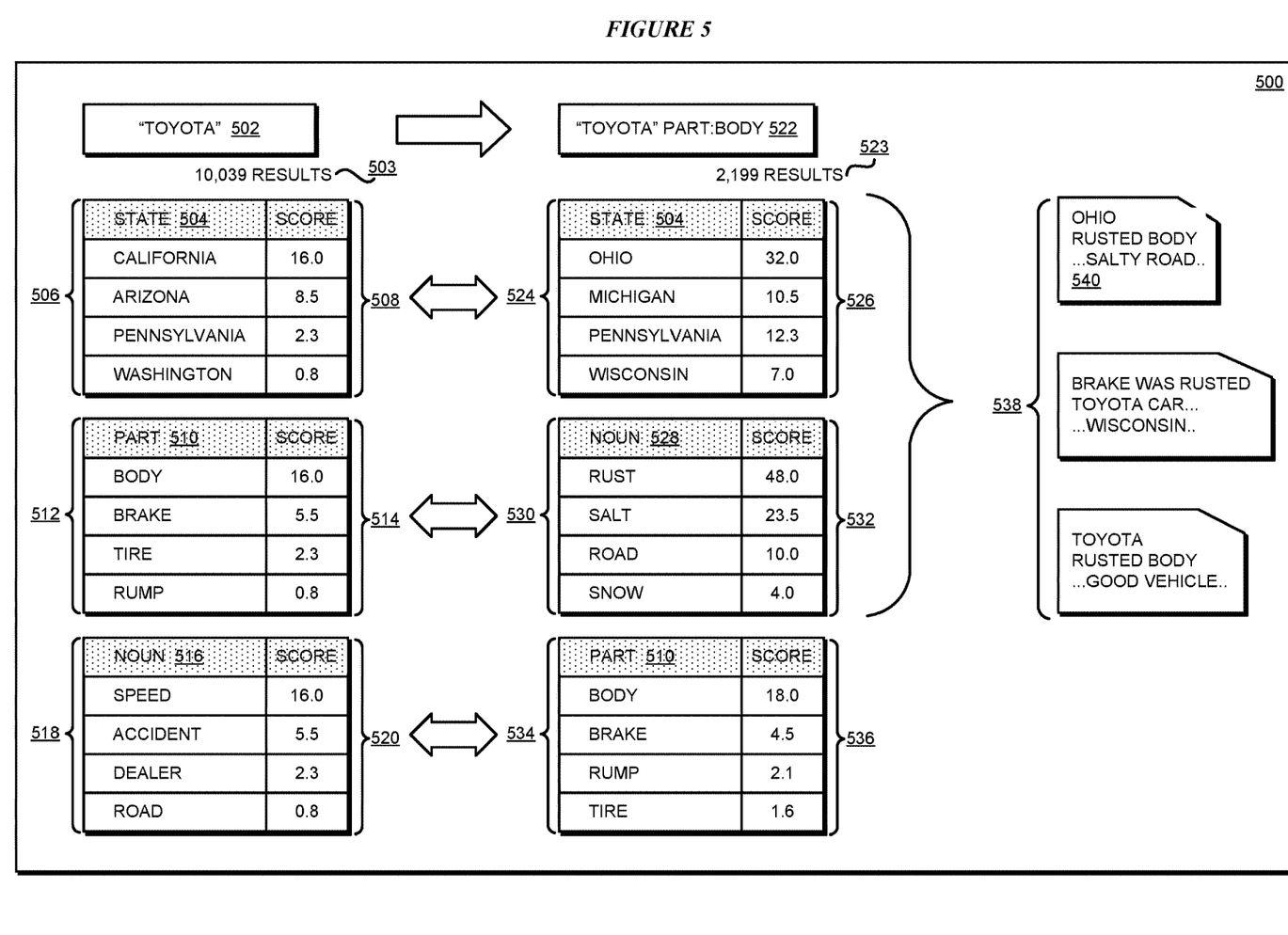
FIG. 5 depicts a block diagram of an example operation for document ranking by progressively increasing faceted query in accordance with an illustrative embodiment.

With reference to FIG. 5, this figure depicts a block diagram of an example operation for document ranking by progressively increasing faceted query in accordance with an illustrative embodiment. Application 402 of FIG. 4 can be used to cause operation 500.

Assume that an initial query is constructed using term 502. Corpus 503 is created with 10,039 documents of the result set, where the documents pertain to "Toyota" in some respect. Dimension 504 is found to include facets 506, which have corresponding scores 508 in corpus 503. Dimension 510 similarly has facets 512 with scores 514, and dimension 516 has facets 518 with scores 520.

Now suppose that a subsequent query is increased in complexity by modifying term 502 to include a high-ranking facet—facet "body" in dimension "part"—that has been discovered in the result set. Accordingly, a subsequent query is constructed using term 522, and is executed on corpus 503. Sub-corpus 523 results in only 2,119 documents.

In this iteration, in sub-corpus 523, different facets in different dimensions have emerged as high-scorers, as compared to dimensions 504, 510, and 516, and facets 506, 512, and 518 in the previous iteration. In the present iteration, dimension 504 has different facets 524 with scores 526 that exceed a threshold score. Dimension 528 is a new dimension that has facets 530 with high scores 532, and dimension 510 has revised ranking of facets 534 with scores 536.

Documents 538 are the documents with ranks that changed by more than a threshold rank distance as a result of participating in the selected high-ranking facets. For example, document 540 has now been ranked highest in document ranking because of document 540's participation in facets "Ohio", "rust", and "body"—each of which are the highest scoring facets in the present iteration. Note that document 540 would not have ranked as high in the previous iteration where the highest ranking facts were "California", "body", and "speed" because document 540 does not participate in two of the three facets.

Figure 6:
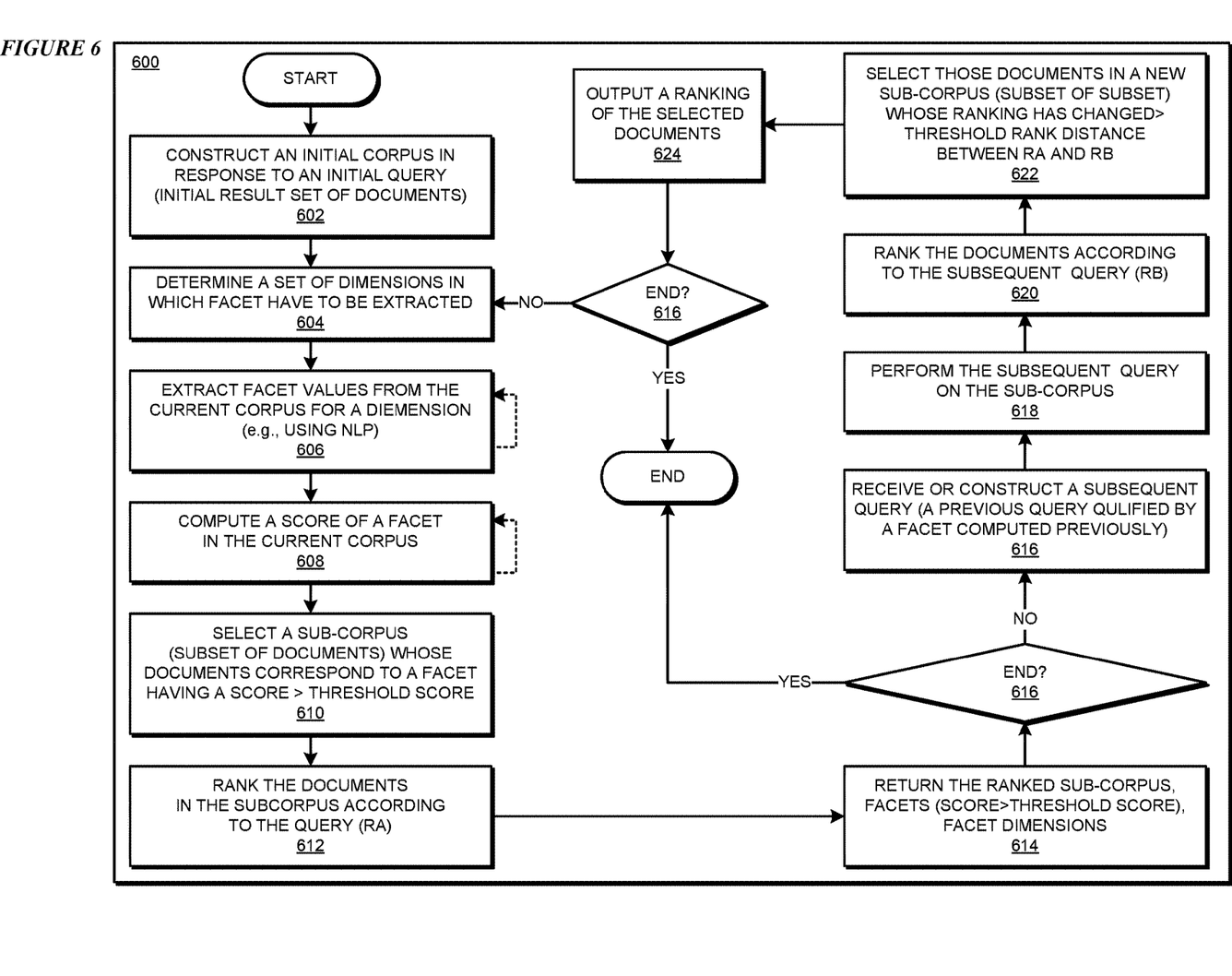
FIG. 6 depicts a flowchart of an example process for document ranking by progressively increasing faceted query in accordance with an illustrative embodiment.

With reference to FIG. 6, this figure depicts a flowchart of an example process for document ranking by progressively increasing faceted query in accordance with an illustrative embodiment. Process 600 can be implemented in application 402 of FIG. 4.

The application constructs an initial corpus in response to an initial query (block 602). This corpus will be regarded as the corpus for this iteration of document ranking in the present search session.

The application determines a set of dimensions in which facets have to be extracted from the corpus (block 604). The application extracts facet values from the corpus for a dimension (block 606). Block 606 repeats for at least some of the dimensions in the set of dimensions.

The application computes a score for a facet in the corpus (block 608). Block 608 repeats for as many facets as may have been extracted for a dimension and as many dimensions as may have to be considered for the corpus.

The application selects a sub-corpus for the current iteration (block 610). The sub-corpus includes the documents that participate in the facets with scores that exceed a threshold score. The application computes a ranking of the documents in the sub-corpus (block 612). This ranking is referred to herein as $R_A$.

The application optionally returns this intermediate ranking as output to the searcher (block 614). At block 614, the application may also provide as output the high-scoring facets and their corresponding dimensions. If the document ranking can be concluded at this point in the process ("Yes" path of block 616), the application ends process 600 thereafter.

If the document ranking cannot be concluded at this point in the process ("No" path of block 616), the application receives or constructs a subsequent query (block 616). The application performs the subsequent query on the sub-corpus (block 618). The application ranks the documents according to the subsequent query (block 620). This ranking is referred to herein as $R_B$.

The application selects the documents in a new sub-corpus with rankings that changed by more than a threshold rank distance between RA and RB (block 622). The application outputs a ranking of the selected document (block 624). If the ranking process can end ("Yes" path of block 626), the application ends process 600 thereafter. If the ranking process should not end ("No" path of block 626), the application returns to block 604 to perform another iteration of document ranking with the new sub-corpus as all or a portion of the corpus for the new iteration.

Thus, a computer implemented method, system or apparatus, and computer program product are provided in the illustrative embodiments for document ranking by progressively increasing faceted query and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   performing, using a processor and a memory, Natural Language Processing (NLP) on a corpus to extract a set of facets corresponding to a dimension in a set of dimensions;
   selecting, using a score threshold, a subset of the set of facets, wherein each facet in the set of facets has a corresponding score relative to the corpus;
   forming a subsequent query by modifying a term of a previous query to include a high-ranking facet in the subset of facets;
   executing the subsequent query on at least a portion of the corpus; and
   ranking documents in a new result set, the new result set being responsive to executing the subsequent query; and
   outputting, from the new result set, a ranking of that subset of documents with ranks that changed by more than a threshold rank distance from corresponding ranks in the corpus.

2. The method of claim 1, further comprising:
   forming a sub-corpus from the corpus such that each document in the sub-corpus participates in a facet in the subset of facets, the sub-corpus forming the portion of the corpus on which the subsequent query is executed.

3. The method of claim 1, further comprising:
   forming a sub-corpus from the corpus such that each document in the sub-corpus participates in a facet in the subset of facets;
   executing the subsequent query to find a different set of documents, the different set of documents not being included in the corpus; and
   forming the portion of the corpus using the sub-corpus and the different set of documents.

4. The method of claim 1, wherein the previous query is a query used in a previous iteration of document ranking in a search session where the set of facets is extracted.

5. The method of claim 1, further comprising:
   computing a ranking of documents in the corpus, wherein a rank of a document in the corpus is a function of a participation of the document in a facet in the set of facets.

6. The method of claim 1, wherein a facet comprises a characteristic of a document in the corpus, wherein the characteristic is recognizable by NLP, and wherein the dimension comprises a type of the characteristic.

7. The method of claim 6, wherein the characteristic is a sentiment expressed in a language of the corpus.

8. The method of claim 1, further comprising:
deducing the set of dimensions from an activity, wherein the activity is other than a search activity involving the corpus.

9. The method of claim 1, further comprising:
receiving the set of dimensions as an input.

10. The method of claim 1, further comprising:
receiving an initial query; and
constructing an initial corpus responsive to the initial query, the initial corpus comprising a set of documents returned by a search engine in a result set in response to the initial query, the initial corpus forming the corpus in a first iteration of document ranking in a search session where the set of facets is extracted.

11. A computer usable program product comprising one or more computer-readable storage devices, and program instructions stored on at least one of the one or more storage devices, the stored program instructions comprising:
program instructions to perform, using a processor and a memory, Natural Language Processing (NLP) on a corpus to extract a set of facets corresponding to a dimension in a set of dimensions;
program instructions to select, using a score threshold, a subset of the set of facets, wherein each facet in the set of facets has a corresponding score relative to the corpus;
program instructions to form a subsequent query by modifying a term of a previous query to include a high-ranking facet in the subset of facets;
program instructions to execute the subsequent query on at least a portion of the corpus; and
program instructions to rank documents in a new result set, the new result set being responsive to executing the subsequent query; and
program instructions to output, from the new result set, a ranking of that subset of documents with ranks that changed by more than a threshold rank distance from corresponding ranks in the corpus.

12. The computer usable program product of claim 11, further comprising:
program instructions to form a sub-corpus from the corpus such that each document in the sub-corpus participates in a facet in the subset of facets, the sub-corpus forming the portion of the corpus on which the subsequent query is executed.

13. The computer usable program product of claim 11, further comprising:
program instructions to form a sub-corpus from the corpus such that each document in the sub-corpus participates in a facet in the subset of facets;
program instructions to execute the subsequent query to find a different set of documents, the different set of documents not being included in the corpus; and
program instructions to forming the portion of the corpus using the sub-corpus and the different set of documents.

14. The computer usable program product of claim 11, wherein the previous query is a query used in a previous iteration of document ranking in a search session where the set of facets is extracted.

15. The computer usable program product of claim 11, further comprising:
program instructions to compute a ranking of documents in the corpus, wherein a rank of a document in the corpus is a function of a participation of the document in a facet in the set of facets.

16. The computer usable program product of claim 11, wherein a facet comprises a characteristic of a document in the corpus, wherein the characteristic is recognizable by NLP, and wherein the dimension comprises a type of the characteristic.

17. The computer usable program product of claim 16, wherein the characteristic is a sentiment expressed in a language of the corpus.

18. The computer usable program product of claim 11, wherein the computer usable code is stored in a computer readable storage device in a data processing system, and wherein the computer usable code is transferred over a network from a remote data processing system.

19. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to perform Natural Language Processing (NLP) on a corpus to extract a set of facets corresponding to a dimension in a set of dimensions;
program instructions to select, using a score threshold, a subset of the set of facets, wherein each facet in the set of facets has a corresponding score relative to the corpus;
program instructions to form a subsequent query by modifying a term of a previous query to include a high-ranking facet in the subset of facets;
program instructions to execute the subsequent query on at least a portion of the corpus; and
program instructions to rank documents in a new result set, the new result set being responsive to executing the subsequent query; and
program instructions to output, from the new result set, a ranking of that subset of documents with ranks that changed by more than a threshold rank distance from corresponding ranks in the corpus.

* * * * *